United States Patent [19]

Aston et al.

[11] 4,385,917
[45] May 31, 1983

[54] METHOD FOR MAKING GLASS BEADS

[75] Inventors: Geoffrey W. Aston, Horsham; Frank D. Moles, Cobham; Roderick M. Smart, Horsham; Andrew H. J. Tate, Rudgwick, all of England

[73] Assignee: Redland Technology Limited, Surrey, England

[21] Appl. No.: 290,294

[22] Filed: Aug. 5, 1981

[30] Foreign Application Priority Data

Aug. 15, 1980 [GB] United Kingdom ............... 8026693
Feb. 23, 1981 [GB] United Kingdom ............... 8105687

[51] Int. Cl.$^3$ ............................................. C03B 19/10
[52] U.S. Cl. ....................................... 65/21.3; 65/142
[58] Field of Search ............................ 65/21.3, 142

[56] References Cited

U.S. PATENT DOCUMENTS 2,619,776 12/1952 Potters .
2,976,574 3/1961 Keutgen et al. ................. 65/21.3 X
3,133,805 5/1964 Robinson .
3,138,444 6/1964 Searight et al. .
3,190,737 6/1965 Schmidt ............................. 65/142
3,361,549 1/1968 Nakajima ......................... 65/21.3

FOREIGN PATENT DOCUMENTS 875292 8/1961 United Kingdom .

Primary Examiner—Robert L. Lindsay, Jr.
Attorney, Agent, or Firm—Young & Thompson

[57] ABSTRACT

A vortex combustion furnace (1) for the production of glass beads is generally cylindrical and has an outlet flue (24) at its upper end. A burner (13) at the lower end burns a gas/air mixture. Secondary air is introduced to the chamber through tangential air inlets (16) and creates a vortex within the chamber. The vortex has a top-hat temperature profile with a central heating region with a temperature in excess of 1000° C. and a surrounding cooling region with a temperature not much above ambient. Glass cullet injected into the chamber follows a spiral path in the vortex, is heated, melts to form glass beads, is then cooled and finally is collected after striking the wall of the chamber.

17 Claims, 6 Drawing Figures

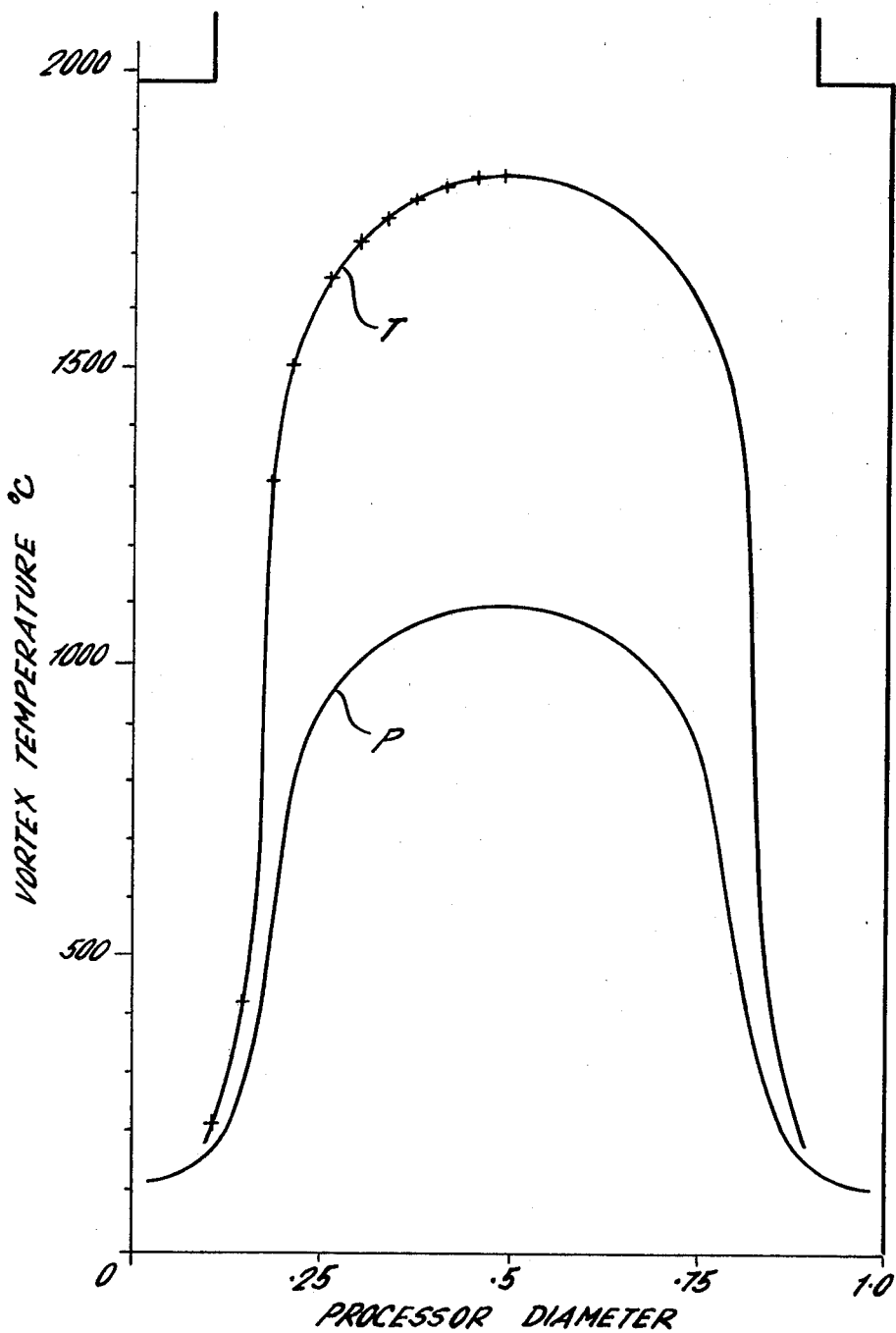

METHOD FOR MAKING GLASS BEADS

This invention is concerned with the production of glass beads and with combustion chambers or furnaces for use in the manufacture of glass beads.

Glass beads, particularly those beads which are used for example, traffic lane marking paints or reflective road signs, are manufactured in many types of furnaces.

Furnaces utilised hitherto having included updraught and downdraught furnaces of either a lazy flame or force flame type wherein cullet, i.e. crushed glass, is charged into the furnace:

(a) at the lower end of the furnace to be thereafter carried upwardly by the combustible gases;

(b) at the upper end of the furnace to be thereafter allowed to fall downwardly under gravitational effects.

In either case the crushed glass cullet is subjected firstly to the heating effects of the furnace and then to the subsequent cooling effects of a quenching zone whereby:

i. particles of crushed glass are raised to a high enough temperature for a sufficient time to be reduced to a transition state;

ii. the transition state particles take the form of beads due to the surface tension phenomenon, i.e. the particles spherulise; and iii. the beads, thus formed, are cooled below their transition temperature to facilitate collection and avoid coalescence with other beads or accretion to walls of the furnace.

The time that particles/beads spend in flight in the furnace is known as the "residence time."

Among the many operating parameters of furnaces for manufacturing glass beads, which parameters have to be closely monitored, is that of the efficiencies of such furnaces. Of late it has become of paramount importance to reduce the amounts of fuel used.

The size of beads produced and the standards of the beads, inter alia, their refractive indexes, are governed by the end uses of the beads. In general, however, it is the production of beads having refractive indexes of approximately 1.4 to 2.1 and diameters of 100 to 1500$\mu$ with which the present invention is particularly though not exclusively concerned.

The efficiency of a furnace in producing glass beads is a function of: (a) the "residence time" of particles of crushed glass in the furnace in relation to the energy supplied to the furnace during that time; (b) the particle density; and (c) the number and size of such particles per unit volume in the furnace. A particle during the "residence time" must have attained its transition state, be formed into a bead and cooled to a state where coalescence and accretion are obviated.

Numerous furnaces for the production of glass beads are known. Thus in U.K. Pat. Nos. 740,145, 875,292 and 984,655 and U.S. Pat. Nos. 2,947,115; 3,151,965 and 3,190,737 there are disclosed several updraught and one downdraught furnace arrangements and one, see No. 984,655, which can only be described as a combination of the two types.

In most of the prior art arrangements it is evident that the "residence time" of a particle is catered for by choosing a long or high substantially linear flight path for the particle and providing a furnace with a long or high flame red heating zone leading to an appropriate cooling zone.

In the apparatus of No. 984,655, however, the flight path which particles are constrained to follow takes the form of a fountain i.e. the particles are projected upwardly and thereafter pass downwardly under the influence of gravity within the constraints imposed by the apparatus on the flow of combusted gases and the beads thus formed fall into a collecting tray or pass outwardly in a radial sinusoidal path to collecting pans.

In U.K. Pat. No. 740,145 there is disclosed a vertically disposed tubular column into which particles of crushed glass are injected along with the combustible gases, the particles being entrained and carried upwardly in the hot gases.

A small intense flame is formed within an orientable rising air current and the rising vehicular gases, together with the particles/beads, pass through cooling zones of increasing intensity. There is thus a temperature gradient upwardly of the column through which the glass particles/beads are constrained to pass.

Extra air is introduced through tangential inlet ports at the top of the column but this is only to speed up those beads which may be losing some of their velocity.

Accretion is obviated by a vibrator device mounted on the wall of the columns.

"Residence time" of particles/beads in the furnace of British Pat. No. 740,145 is regulated within fine limits by adjusting the velocity at which the particles are injected into the flame at the bottom of the column.

In U.K. Pat. No. 875,292 there is disclosed one apparatus, see FIGS. 1 to 3, having a vertically disposed furnace to which a combustible mixture of gas/air is fed together with particles of crushed glass. Beads resulting therefrom pass through a quenching zone to a lower collection bin or through a gas flue in an upper portion of the quenching zone to a cyclone separator. There is a temperature gradient across the quenching zone just upwardly of the furnace where the hot gases pass into the cooling air. In addition the flight paths of particles/beads in the said one apparatus, through the quenching zone, is a function of the bead mass/gravity and/or a function of the bead mass/combusted gas velocity.

In a second apparatus disclosed in FIG. 6 and 8 of the British Pat. No. 875,292 there is an arrangement of burners 51 which are adjusted to give the combusted gases in the furnace area a spiraling action which tends to equalise the temperature throughout the furnace. A quenching zone is provided immediately above the furnace. Air is allowed to enter the apparatus at entry ports 76 below the furnace, see FIG. 6, the purpose of the air being partly to aid combustion and partly to avoid accretion of the particles/beads to the furnace walls.

Beads formed in this apparatus are collected through an upper flue and a cyclone separator.

The temperature gradient in the second apparatus is again seen to be heightwise of the apparatus, i.e. substantially colinear with the flight path of the particles/beads. There is in both apparatuses an obvious temperature gradient across the furnaces thereof due to the central combusted gases and the cooler air at the walls thereof; however, the main flow of gases and particles/beads is upwardly.

The furnace disclosed in U.S. Pat. No. 3,190,737 is basically an updraught furnace and comprises an open telescope configuration of inter connected cylindrical chambers through which a combustible mixture of gas/air and particles/beads are fed along with a rising current of air at the periphery of the chambers. The air is fed through tangential ports at junctions of the telescoped chambers and swirls upwardly against the walls of the chambers to prevent coalescence and accretion. The flame from the combustible gases is intended to provide heating throughout the entire length of the furnace and the particles/beads are constrained to remain substantially in the central region of the furnace and in fact any straying particles/beads are pushed back into the centre by the action of the swirling cushion of air.

All the above arrangements involve a long "residence time" and the long "residence times" of the particles/beads will lead to undesirably high power consumption rates. The present invention provides a method of producing glass beads comprising the steps of:

(a) introducing a first combustible gas or mixture of gases into a generally cylindrical chamber;

(b) igniting said first gas to form a flame of sufficient size and temperature to melt particles of glass introduced thereinto;

(c) introducing a current of a second gas or mixture of gases into said chamber generally tangentially of the chamber wall to:

(i) cause said flame to swirl in the manner of a vortex; and (ii) provide a quenching zone of gas surrounding said flame;

(d) introducing particles of glass or glass-forming materials into the swirling flame in such a manner that the particles enter the flame at or towards the centre thereof and follow a spiraling path through the flame for a period of time sufficient to form a bead, the bead thereafter passing into the quenching zone where it hardens before reaching the chamber wall and (e) collecting beads so formed.

Preferably the temperature gradient across the chamber is generally in the shape of a top-hat to provide a heating zone of sufficient temperature to cause the particles to form glass beads and a quenching zone of very much lower temperature.

In one example when the first gas was a propane/air mixture, the temperature of the heating zone was in excess of 1000° C. and that of the quenching zone less than 300° C. and preferably less than 150° C.

In another example, using a propane/air/oxygen mixture as primary gas, the equivalent temperatures were in excess in 1500° C. and less than 500° C., preferably 200° C.

The invention also provides apparatus for producing glass beads by the method described above and comprising a generally cylindrical chamber, at least one nozzle for introducing said first gas into the chamber, igniting means, at least one inlet port for introducing said second gas under pressure into the chamber, on outlet for exhaust gases and means for injecting the particles of glass or glass forming materials into the chamber.

Preferably the chamber is arranged with its axis generally vertical, said at least one nozzle is adjacent the axis of the chamber at the lower end thereof, said gas outlet is co-axial with the chamber at the upper end thereof and said at least one inlet port is provided in the peripheral wall of the chamber.

The invention still further provides beads produced by the above method and apparatus and road marking materials including such beads.

A preferred embodiment of a vortex furnace apparatus suitable for producing glass beads by the method of the invention will now be described, by way of example, with reference to the accompanying drawings, in which:

FIG. 6 is a diagram showing the temperature profile with the furnace chamber under two different sets of operating conditions.

Figure 1:
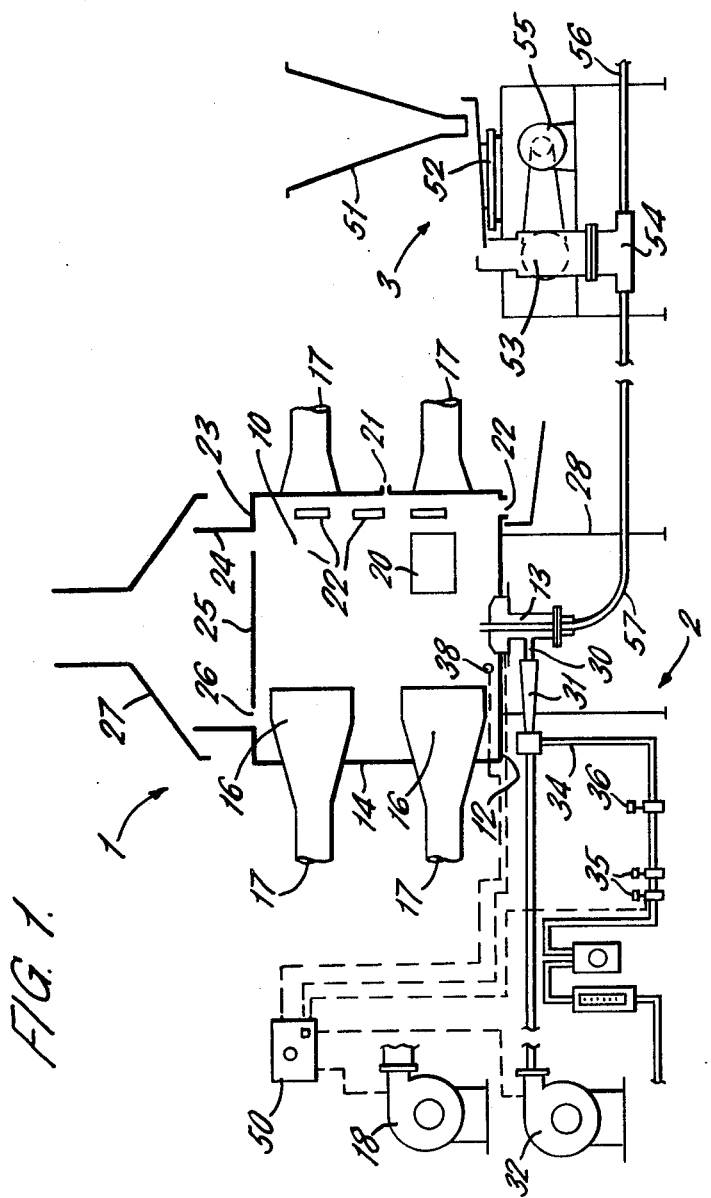
FIG. 1 is a schematic side elevation view of the vortex furnace apparatus.

The drawings show a vortex furnace apparatus specifically for the production of glass beads. The major components of the apparatus are a furnace 1, a burner assembly and gas supply generally indicated by 2, and a material feed apparatus generally indicated by 3.

The furnace 1 is a substantially cylindrical chamber 10, a lower end wall 12 of which includes a central hole in which the burner assembly 13 is located. The peripheral wall 14 of the chamber has attached thereto four tangentially disposed air inlets 16 arranged in two diametrically opposed pairs, one in the upper half of the chamber 10 and one in the lower half. The inlets 16 taper back to pipes 17 which are connected via a manifold (not shown) to a source of secondary air 18. The source 18 may be a pump of known type with suitable controls for the rate of flow of air to the inlets 16.

An inspection port 20 is provided in the wall 14 of the chamber as is a port 21 into which a thermocouple may be inserted for measuring the temperature within the chamber 10. An outlet port 22 for glass beads is provided in the lower end wall 12 at the periphery thereof and further outlet ports 22' around the periphery of the chamber.

An upper end wall 23 of the chamber includes a centrally disposed flue 24 the diameter of which is calculated as will be described below. A stop-plate 25 is located in the flue 24 to provide an annular outlet 26 for gases from the chamber and an extractor unit 27 is positioned above the flue. The chamber 10 is mounted on legs 28. The chamber is fabricated from mild steel and is of approximately equal diameter and height.

The burner assembly 13 (which will be described in more detail below) has an inlet 30 for a gas/air mixture to be combusted. The gas and air are mixed in a mixing venturi 31 to which air (primary air) is supplied by a pump 32 or other suitable means. The combustion gas, usually propane is supplied to the venturi 31 through a line 34 including flow control and metering valves and devices 35 of known type. The line 34 also includes a cut-off valve 36 which automatically operates to close and cut-off the gas supply in the event of failure of certain parts of the system. This prevents accumulation of unburnt gas in the chamber. The valve 36 closes in the event of (a) failure of primary air supply, (b) failure of secondary air supply, (c) flame failure (which is detected by an ultra violet sensitive photocell 38 in the peripheral wall of the chamber).

Figure 2:
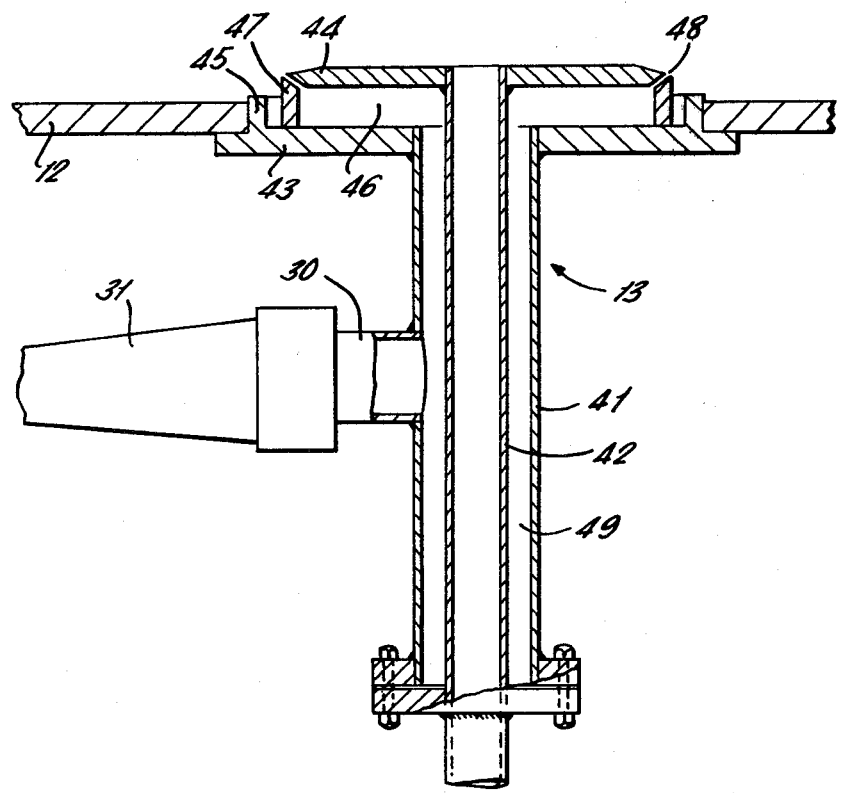
FIG. 2 is an enlarged section through a burner assembly of the apparatus of FIG. 1.

Referring now to FIG. 2, the burner assembly 13 comprises two concentric pipes 41,42 having welded to their upper ends annular flanges 43,44. Flange 43 includes a circular upstanding wall portion 45 by means of which the burner assembly is fixed to the lower end wall 12 of the chamber. The pipe 42 which is open at its upper end projects above flange 43 so that an annular chamber 46 is defined between the two flanges around pipe 42. A cylindrical wall portion 47 depending from flange 44 and abutting flange 43 closes off the chamber 46 and includes a number of gas outlet nozzle 48.

There may be approximately thirty nozzles 48 spaced around the wall portion 47 and opening through the wall at approximately 45° to the axis of pipes 41,42 as illustrated in FIG. 2. Pipe 41 is sealed at its lower end around pipe 42 to define an annular passage 49 through which the gas/air mixture entering inlet 30 passes. The lower end of pipe 42 is connected to the material supply as will be described below.

A spark device (not shown) is attached to the burner assembly for igniting the gas/air mixture and the spark device as well as the flow of primary air and gas are controlled remotely from control panel 50.

Glass cullet or the material to be processed in the furnace is supplied from the material feed apparatus 3. Apparatus 3 comprises a bulk hopper 51 which supplies glass cullet continuously to a variable vibro-feeder flow control 52. The vibro-feeder 52 meters the flow of cullet to a rotary valve 53 (driven by a motor 55) which discharges the cullet into a venturi box 54. In the box 54 the cullet is entrained in a compressed air stream supplied from a line 56 and thereby transported through line 57 to pipe 42.

Under conditions of high material flow rate the venturi box can operate at a positive gauge pressure, the rotary valve acting as a controlled leakage device. Provision may be made for a second air feed to the venturi box terminating with a fluidiser to aid material flow.

The rotary valve, venturi box and pipework have been designed or specified for operation at up to 300° C. This will allow pre-heating of the ground glass.

Figure 3:
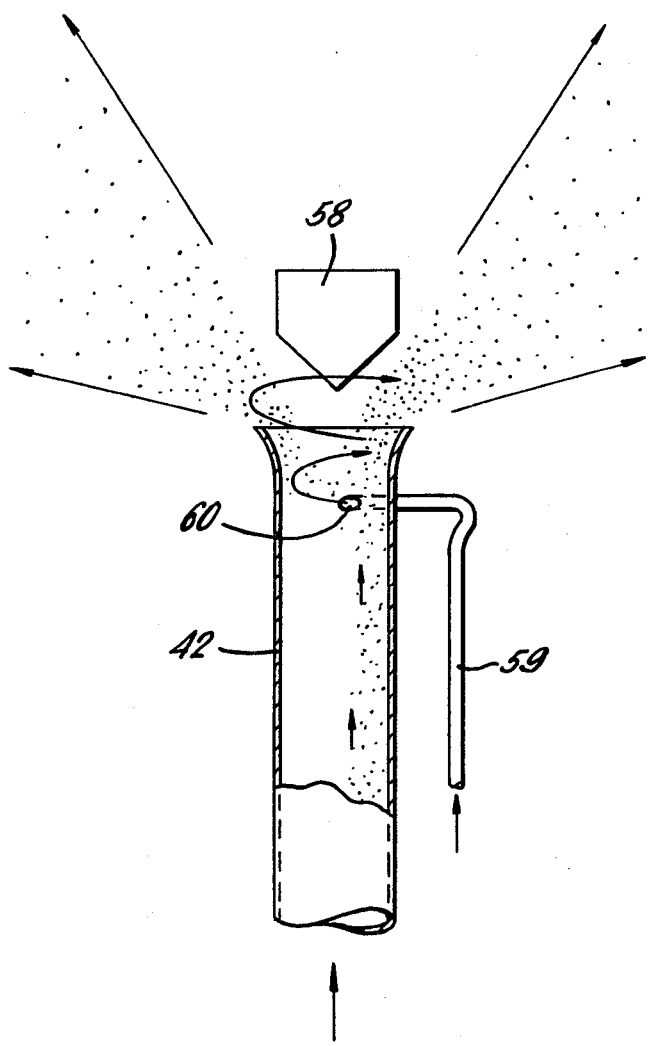
FIG. 3 is an enlarged section through a material injection nozzle of the apparatus of FIG. 1.

The pressure and flow rate of the air supply are defined by the pipe diameter and glass feed rate required. An independent system is required to control the height of the 'fountain' of glass, and this is illustrated in FIG. 3. The upper end of pipe 42 is slightly flared and a deflector cone 58 as positioned (vertex downwards) adjacent the open end of the pipe. To avoid a tendency for cullet passing up pipe 42 to become localised in one area of the pipe, a source 59 of air under pressure is connected to an orifice 60 in the pipe 42. This secondary air supply enters the tube at an appropriate angle to cause the air in pipe 42 to swirl thereby ensuring that cullet emerges from pipe 42 around the whole circumference of the pipe and becomes scattered evenly in the flame.

The operation of the vortex furnace is as follows. The air vortex is created by the tangential air flow entering the cylindrical chamber 10 through the two pairs of diametrically opposite air inlets 16.

Figure 4:
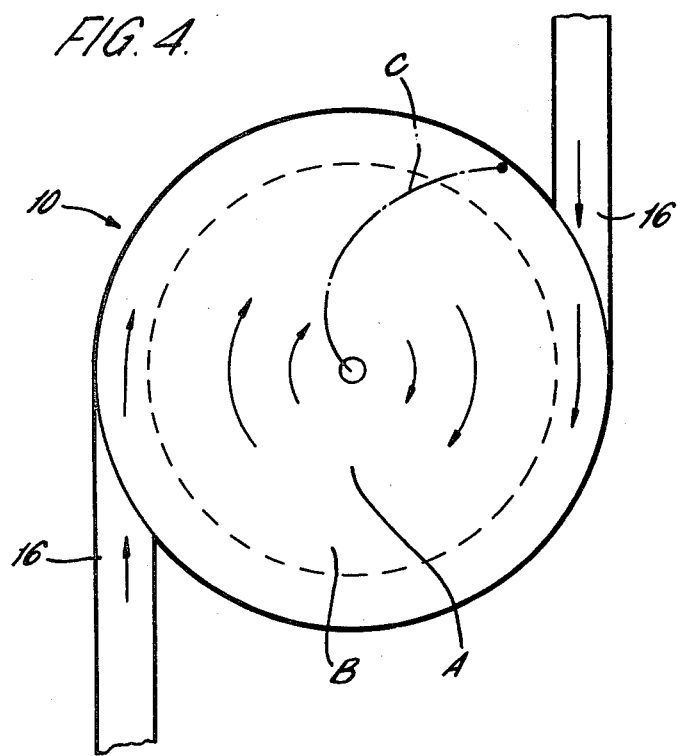
FIG. 4 is a schematic plan view of the furnace chamber of the apparatus of FIG. 1 showing the flight path of a particle within the chamber.
Figure 5:
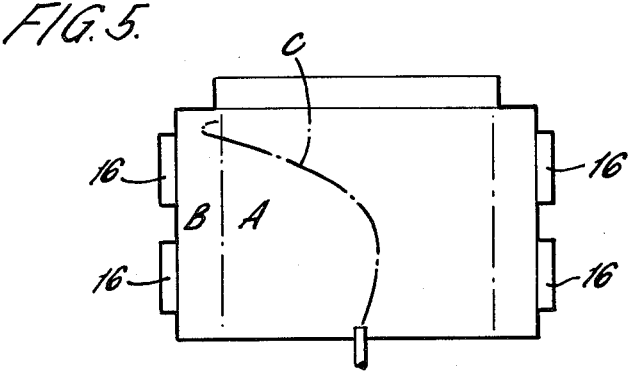
FIG. 5 is an schematic elevation view corresponding to FIG. 4.

With the flame origin at the base of the chamber, a central, very hot and sharply defined cylindrical vortex flame A is generated, this comprises the central heating zone of the processor. The incoming secondary air flow creates an outer region of cool air B which comprises the cooling zone. This completely surrounds the central hot region of the vortex. Glass particles are injected into the chamber from the centre of the processor base and are allowed to become entrained in the vortex flow. The momentum of the particles and the centrifugal forces acting on the particles cause them to follow a spiral path C upwards and outwards from the base of the processor (FIGS. 4 and 5). While following this spiral path through the chamber the particles pass first through the central heating zone where they attain a temperature of approximately 1000° C. becoming molten and rounded by surface tension effects. The particles pass directly into the surrounding cooling zone where they solidify to become solid glass spheres before striking the wall of the processor and either falling to the processor base or passing out of the chamber through ports 22'. Throughout the process the glass particles remain discrete and do not collide with each other or with any part of the processor until cold and solidified when they fall to the base the collection through outlet 22. Guides may be provided in the chamber 10 to divert the processed beads towards outlet 22.

The flame is generated from the burner assembly which is located centrally on the base of the chamber. Glass flow is controlled by conventional flow metering equipment, a mixture of propane, natural gas or some other suitable combustible gas, and air is used. The gas/air flow control permits variation of the gas: air ratio as required.

It will be appreciated that the primary air is premixed with the gas for combustion while the secondary air supplied to the tangential air inlets creates the vortex flow and completes the oxygen requirement for combustion.

Two distinct flame conditions can be generated in the chamber 10 and these are referred to as the free and fixed vortex modes. Both flame types are generated from the same or similar burner assemblies and under similar aerodynamic conditions in the chamber. The critical factors governing which of the two will be generated are:

(i) gas flow rate.
(ii) flue and burner design and dimensions.

Two distinct regions are identified in the vortex chamber, these are the free and fixed vortex volumes. The central region of the chamber 10, the diameter of which is defined by the diameter of the flue 24, is the fixed vortex volume. The annular-shaped volume surrounding this region and extending to the chamber wall is defined as the free vortex volume.

The following summarises the characteristics of each of the two flame conditions and their respective requirements.

The free vortex condition is less specific in its requirements. This mode is identified by a more confined highly turbulent and intense flame with high heat release rates. It is obtained over a wide range of gas flow rates and has higher rotational velocity. Flame diameter is determined by the diameter of the burner gas outlets 48. For free vortex generation, this must be greater than the diameter of the chamber flue. Flame generation takes place in the outer free vortex volume of the chamber. This type of flame can be generated with or without primary air pre-mixed with fuel gas, and provides an axially compact heating zone with high rotational velocity less suited to the production of glass beads.

The fixed vortex mode is more specific in its requirements. This is identified as a very broad less turbulent but very hot flame with lower heat release rates. Flame diameter is determined by flue dimensions and will normally be about 90° of flue diameter. Flame diameter is highly sensitive to flue dimensions, a narrow flue will result in a narrow fixed vortex flame even at high gas flow rates.

With a wide flue opening, for example, 80% of chamber diameter, and sufficient gas flow rate, a wide fixed vortex flame will be obtained. The flame may be 70% of the diameter of the chamber. The sensitive nature of the flame diameter is illustrated by the fact that if the wide flue diameter is capped by a narrow extractor unit 27 placed too close to the top of the vortex chamber, then the flame diameter will be determined by the diameter of the extractor opening, and not by the diameter of the chamber flue.

Fixed mode combustion is stablised in the chamber 10 illustrated by use of a stopped or annular-shaped flue. The circular plate 25 located centrally at the base of the flue chimney creates an annular flue 26 and this has been found to stabilise the fixed vortex condition. Typically, the plate will have a diameter approximately 80% of that of the flue opening.

This type of vortex flame is more readily obtained with a primary air supply providing a gas/air mixture for combustion. Flame diameter is determined by flue geometry and not by burner dimensions.

The fixed mode creates conditions of heating and cooling ideal for the formation of glass beads. A typical temperature profile obtained for the fixed vortex mode in the chamber 10 is shown in FIG. 6 marked P.

In carrying out the method of manufacture of glass beads according to the present invention the following steps are followed:

(a) a regulated flow of combustible gas is introduced to the chamber 10 via the gas supply means 2;

(b) the gas is ignited to form a concentrated cylinder of flame in the lower portion of the chamber 10;

(c) a regulated current of air is introduced to the chamber 10 via the tangential ports 16 to contribute towards the formation and shape of the flame by causing it to swirl in the manner of a vortex, the current of air also providing a quenching zone of swirling turbulent gas surrounding said flame and being at a temperature approaching ambient temperature;

(d) a regulated quantity of glass cullet is introduced at a predetermined injection velocity into or towards the centre of the swirling cylinder of flame the injector pipe 42 in such a manner that the particles are entrained in the vortex and constrained to follow the helical spiral path C extending upwardly and outwardly of the chamber towards the peripheral wall thereof, the particles being resident in the swirling flame for sufficient time to become spherulised to form a bead, the bead thereafter passing into the quenching zone where the bead is subjected to cooling effects which harden the outer skin of the bead whereby coalescence of the beads is avoided as is accretion of the beads to the wall of the furnace chamber; and (e) the beads are recovered either from the ports 22' of the chamber 10 where they first collect after impinging on the wall of the chamber or from the bottom of the chamber to where they fall after spherulisation and solidification.

It will be appreciated that the smaller particles of cullet tend to follow lower, shorter flight paths within the chamber 10 and have a shorter residence time than the larger particles.

The beads produced in the furnace described above, by the method just described, compared more than favourably with beads obtained from known commercial production methods. There is also the added advantage that the beads are produced from an energy input per unit volume of production of beads which is considerably less than fuel consumption rates for known production methods. In fact fuel savings in excess of 50 to 75% can be expected from the method described above depending upon the bead to be produced when compared to prior art methods of producing glass beads.

Still further fuel savings may be obtained by preheating the glass cullet to a temperature of approximately 200°–300° C. The cullet may be so heated using the hot flue gases and an appropriate heat-exchanger system.

In one example of a chamber of 1 meter diameter and 1 meter height, into which a propane/air mixture was fed the operating variables were in the following ranges:

Gas flow rate: 1400–14000 liters/min
Primary air flow rate: 280–7000 liters/min
Secondary air flow rate:
   5600–56000 liters/min
   (1400–14000 liters/min/inlet)
Flame temperature: as shown by line P in FIG. 6
Flame width: 10 cms–90 cms
Glass bead production rate: Up to 20 kg/min In use of this chamber in one particular example, 2.04 Kg of glass cullet was processed through the chamber while 85 liters of propane were burnt. 2.00 kg of glass beads were produced of which 95% were spheres and 5% were flame polished particles or particles of cullet which had not been converted into beads. The energy consumption was approximately 3.6 MJ/kg of beads.

The temperature profile illustrated by Line P in FIG. 6 is particularly suitable for producing glass beads from cullet but higher temperature may readily be achieved in the chamber 10. This can be achieved either by preheating of the primary or secondary air supply or by increasing the oxygen content of the primary air supply by addition of pure oxygen to the combustion gases prior to combustion.

By using oxygen enrichment of the vortex flame, temperatures of approximately 2,000° C. have been generated. A typical temperature profile obtained from this type of flame is shown in FIG. 6 and marked T. Aerodynamic conditions in the chamber are identical to those described above. With the exception of the much greater temperature increase across the flame boundary, flame characteristics are essentially identical to those described for the fixed vortex flame.

High combustion temperatures will favour much more rapid heat transfer to any entrained material and greater heating rates will be obtained. While 1,000° C. may be the minimum temperature for successful operation of the process, optimum operating efficiency may well be achieved at higher operating temperatures, say, 1400° C. It has been demonstrated that adjustment of the vortex temperature can be achieved by control of the oxygen content of the gas/air pre-mixture. Increase of the oxygen content allows adjustment of the vortex temperature to generate temperatures of, for example 1400° C. 1,600° C. or 1,800° C. respect. Maximum temperatures of about 2,000° C.–2,500° C. can be expected at the stoichiometric oxygen requirement with primary air pre-heating using propane.

Use of higher vortex temperatures has the additional advantages of higher production rates and/or allowing reduction in processor chamber dimensions.

The higher temperatures may also be utilized to form beads from glass-forming materials rather than glass cullets.

A number of oxides, both metallic and non-metallic have glass forming properties. The most common and the most useful commercially is silica, $SiO_2$, which is used as the basic glass-forming oxide in most commercial glasses.

In one method of manufacturing glass, oxide is heated to temperatures above its melting temperature until completely molten and subsequently cooled or chilled rapidly. With some oxides, providing cooling is sufficiently rapid, a glass will be obtained. With non glass-forming oxides, the oxide will be obtained in crystalline form. Slower cooling of all oxide melts will always result in crystallisation. The cooling rate therefore is critical in the formation of glasses from oxide melts. Glasses are variously described as vitreous, amorphous or non-crystalline. The important characteristic being the absence of crystallinity in their structure. Glasses and crystalline materials are readily distinguished by examination of their respective physical characteristics, in particular their optical and diffraction properties. All glasses are thermodynamically metastable and will always revert with time or thermal treatment to their more stable crystalline forms, for example, the stable crystalline form of silica is quartz.

Of all the pure oxide glasses, silica glass is the most readily formed and the least readily de-vitrified or crystallised. As such comparatively large quantities of the oxides can be added to silica with retention of glass forming properties. Commercial glass contains about 30% each by weight of soda ($Na_2O$) and lime (CaO)—so called soda-lime-silica glass.

Other oxides may be added to obtain glasses having different properties, for example; titanium oxide ($TiO_2$) or lead oxide (PbO) to increase refractive index and density, aluminum oxide ($Al_2O_3$) to increase softening temperature and toughness, iron oxides ($Fe_2O_3$) to introduce colour etc.

The process described above but using the temperature profile T is suitable for making beads from glasses having any composition mentioned above.

Using a high temperature process it is possible that glass beads could be made from crushed quartz or directly from a quartz or quartz-rich sand of suitable particle size and quality.

The melting point of quartz (1632° C.) lies well within the temperature range attainable either with oxygen enrichment or air pre-heating.

Beads made from a reasonably pure quartz would effectively be pure silica glass and as such would have substantial chemical and physical durability.

In carrying out the method of bead manufacture utilizing the furnace it is believed that the beads are produced at efficiencies which are vastly superior to those available in known furnaces. This results from a combination of circumstances including:

(a) the enhanced combustion of the gas mixture within the chamber. In fact it is considered that the conditions approach those which are regarded as ideal for combustion of gases;

(b) the heat transfer properties of the turbulent conditions within the furnace which enables speedy and effective transfer of heat from the furnace atmosphere to particles of glass;

(c) the aerodynamic control of the flight path of beads within the chamber, viz;
 (i) small beads have low and short flight paths; and
 (ii) large beads have high and long flight paths;

(d) the density of bead population within the furnace can be dramatically increased i.e. the beads can be much closer together, because the flight paths of the beads are so controllable and this is achieved without increasing the danger of collision between particles and beads thereby avoiding the danger of mutual coalescence of the particles and beads;

(e) the superior cooling characteristics of the air curtain provided adjacent the peripheral wall of the chamber whereby;
 (i) faster cooling of the beads is effected; and
 (ii) accretion of beads to the furnace wall is obviated; and (f) the provision of the "top hat" temperature gradient diametrically disposed across the furnace when it is in use.

We claim:

1. A method of producing glass beads comprising the steps of:
 (a) introducing a first combustible gas or mixture of gases into a generally cylindrical chamber;
 (b) igniting said first gas to form a flame of sufficient size and temperature to melt particles of glass introduced thereinto;
 (c) introducing a current of a second gas or mixture of gases into said chamber generally tangentially of the chamber wall to:
  (i) cause said flame to swirl in the manner of a vortex; and
  (ii) provide a quenching zone of gas surrounding said flame;
 (d) introducing particles of glass or glass forming materials into the swirling flame in such a manner that the particles enter the flame at or towards the centre thereof and follow a spiraling path through the flame for a period of time sufficient to form a bead, the bead thereafter passing into the quenching zone where it hardens before reaching the chamber wall; and
 (e) collecting beads so formed.

2. A method as claimed in claim 1 in which the chamber is arranged with its axis generally vertical, the particles of glass are injected upwardly from a lower end of the chamber and the beads are recovered by falling to the said lower end where they are collected.

3. A method as claimed in claim 1 in which the first gas comprises a mixture of a combustible gas and air and the second gas is air.

4. A method as claimed in claim 3 in which the combustible gas is propane.

5. A method as claimed in claim 1 in which the temperature gradient across the chamber is generally in the shape of a top-hat to provide a heating zone of sufficient temperature to cause the particles to form glass beads and a quenching zone of very much lower tempertures.

6. A method as claimed in claim 5 in which the temperature of the heating zone is in excess of 1000° C. and that of the quenching zone less than 300° C.

7. A method as claimed in claim 5 in which the temperature of the heating zone is in excess of 1500° C. and that of the quenching zone less than 500° C.

8. A method as claimed in claim 7 in which the first gas is a mixture of propane, air and oxygen.

9. Apparatus for producing glass beads, comprising a generally cylindrical chamber, at least one nozzle for introducing a first gas into the chamber, igniting means for igniting said first gas to cause said first gas to burn with a flame, at least one inlet port for introducing a second gas under pressure generally tangentially into the chamber to cause said flame to swirl in the manner of a vortex, an outlet for exhaust gases and means for injecting particles of glass or glass forming materials into the chamber into the flame at or towards the center of the flame.

10. Apparatus as claimed in claim 9 in which the chamber is arranged with the axis generally vertical, said at least one nozzle is adjacent the axis of the chamber at the lower end thereof, said gas outlet is co-axial with the chamber at the upper end thereof and said at least one inlet port is provided in the peripheral wall of the chamber.

11. Apparatus as claimed in claim 10 in which there is a plurality of nozzles arranged in a generally circular pattern around the axis of the chamber.

12. Apparatus as claimed in claim 11 in which the glass particle injector means includes a pipe opening axially of the chamber at the centre of the nozzles.

13. Apparatus as claimed in claim 10 in which there are four inlet ports for secondary gas, arranged in two diametrically opposed pairs.

14. Apparatus as claimed in claim 10 in which the diameter of the gas outlet is at least 50% of the diameter of the chamber.

15. Apparatus as claimed in claim 9 further comprising means for supplying said first gas, said means including a flow control valve.

16. Apparatus as claimed in claim 9 in which the injector comprises a pipe through which compressed air is blown and into which the particles are fed.

17. Apparatus as claimed in claim 16 in which the injector means further comprises a rotary valve for metering the feed of particles.

* * * * *